June 13, 1967  F. A. HELM  3,325,067
CAR TOP LUGGAGE CARRIER
Filed April 12, 1965
5 Sheets-Sheet 2
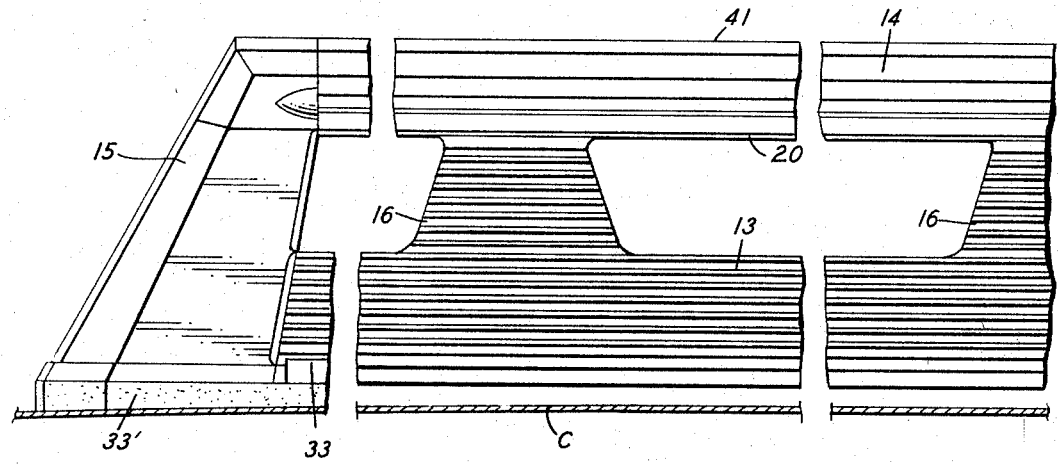
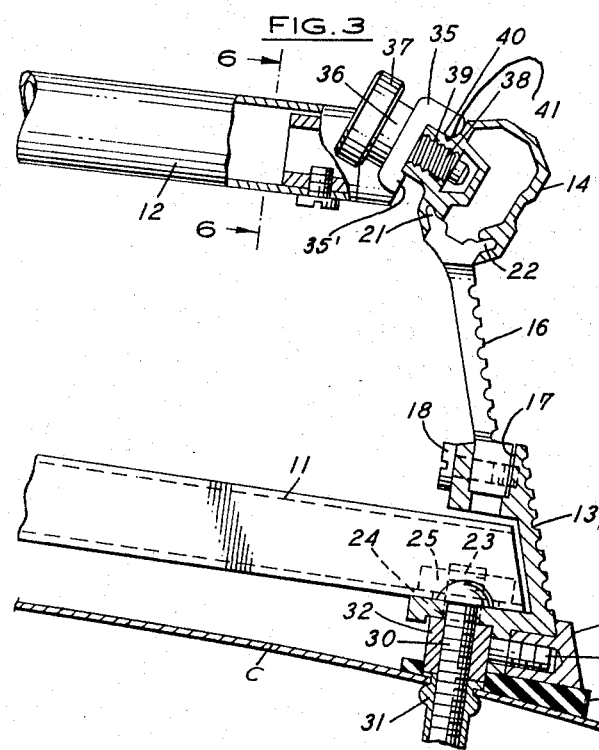
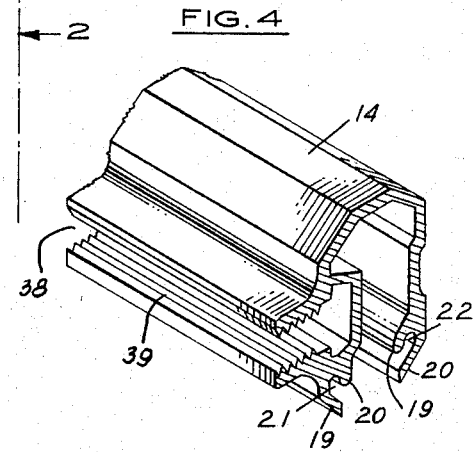
INVENTOR
FREDERICK A. HELM
ATTORNEYS June 13, 1967 F. A. HELM 3,325,067
CAR TOP LUGGAGE CARRIER
Filed April 12, 1965 5 Sheets-Sheet 3
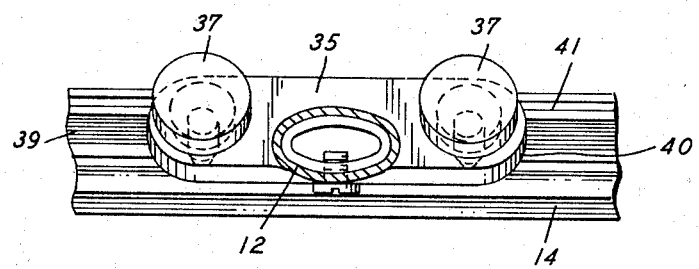
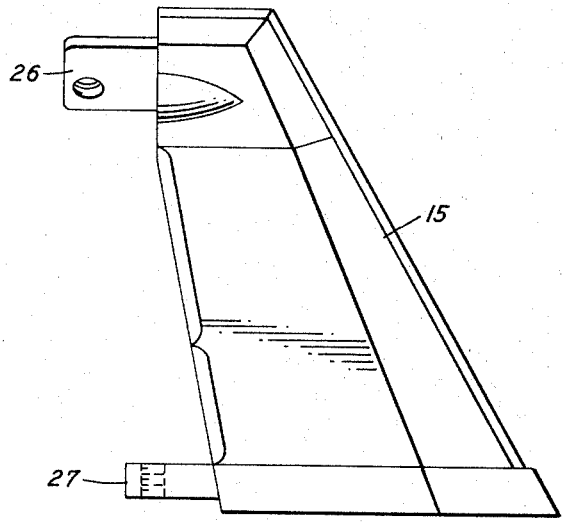
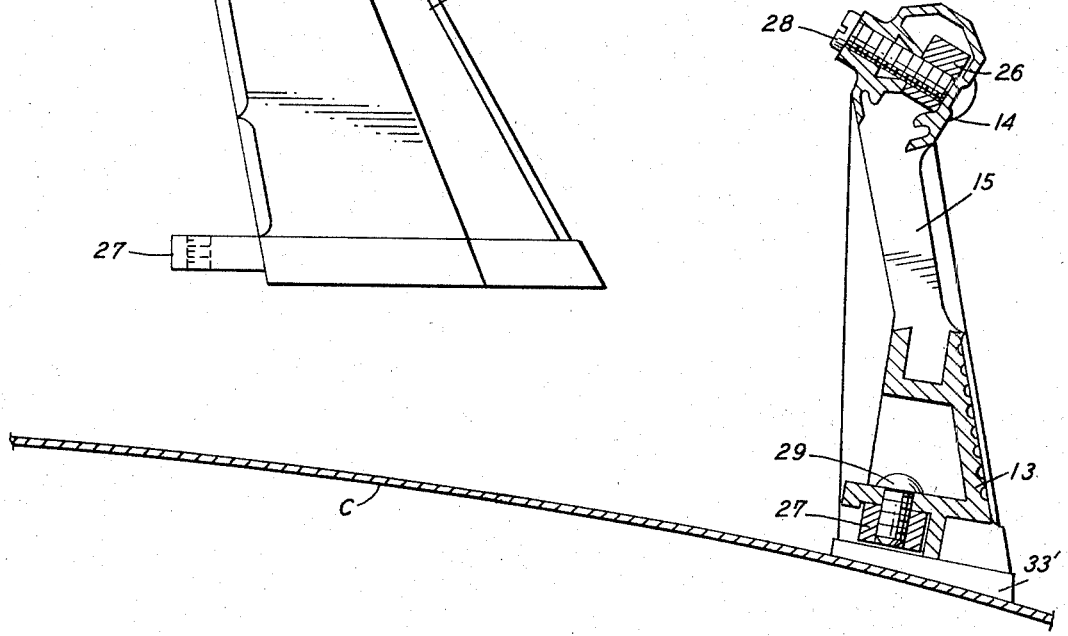
INVENTOR
FREDERICK A. HELM
BY
*Barnes, Kisselle, Raisch Choate*
ATTORNEYS June 13, 1967 F. A. HELM 3,325,067

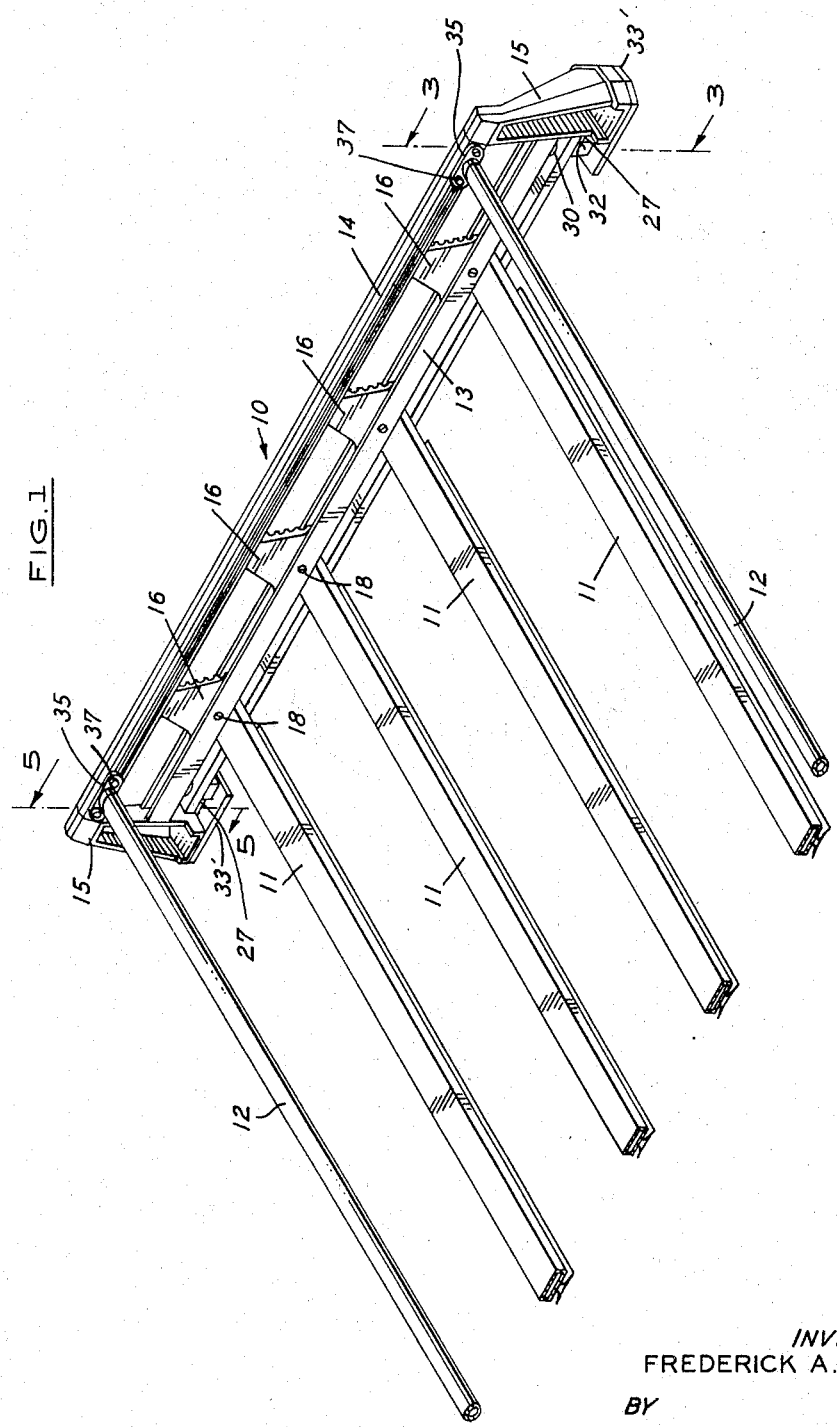

CAR TOP LUGGAGE CARRIER

Filed April 12, 1965 5 Sheets-Sheet 4

INVENTOR.
FREDERICK A. HELM

BY Barnes, Kisselle
Raisch Choate
ATTORNEYS

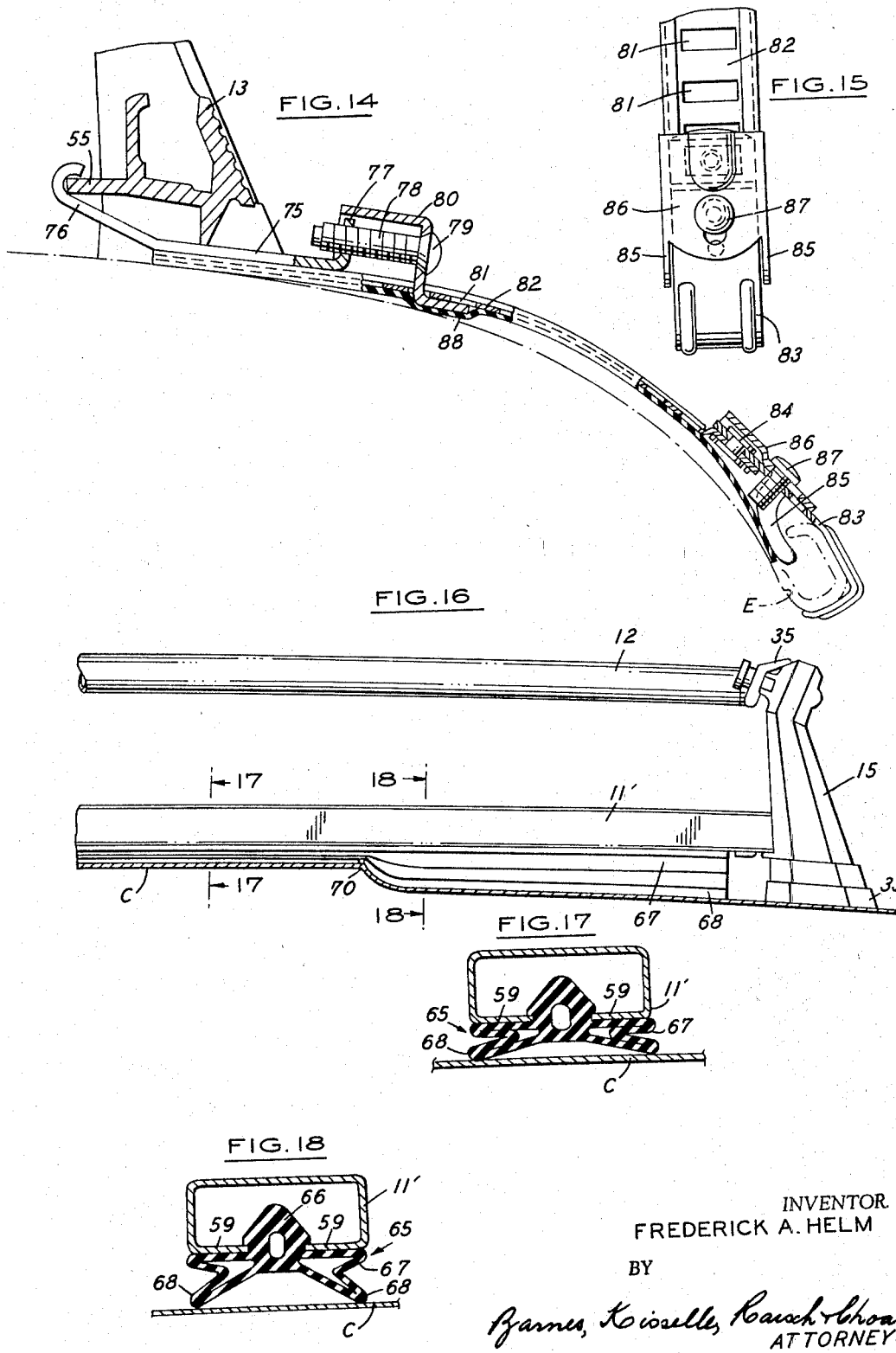

United States Patent Office 3,325,067
Patented June 13, 1967

3,325,067
CAR TOP LUGGAGE CARRIER
Frederick A. Helm, Detroit, Mich., assignor to Helm Design & Manufacturing, Inc., Detroit, Mich., a corporation of Michigan
Filed Apr. 12, 1965, Ser. No. 447,215
16 Claims. (Cl. 224—42.1)

This invention relates to car top luggage carriers.

It is an object of this invention to provide a car top luggage carrier which can be manufactured at low cost with a minimum of labor; which utilizes extrusions; which has parts thereof in tension thereby minimizing any tendency for the parts to loosen and make noises; which incorporates a longitudinally movable end rail that can be readily moved from one position to another to retain any width of luggage or loads firmly; which can be mounted permanently on the car top or can be removably mounted by the use of straps.

In the drawings:

FIG. 1 is a fragmentary perspective view of a car top luggage carrier embodying the invention.

FIG. 2 is a fragmentary side elevational view of the same on an enlarged scale.

FIG. 3 is a fragmentary sectional view on an enlarged scale taken along the line 3—3 in FIG. 1.

FIG. 4 is a fragmentary perspective view of a portion of the carrier.

FIG. 5 is a fragmentary sectional view on an enlarged scale taken along the line 5—5 in FIG. 1.

FIG. 6 is a fragmentary sectional view taken along the line 6—6 in FIG. 3.

FIG. 7 is a side elevational view of an end stanchion.

FIG. 14 is a fragmentary sectional view showing a strap mounting for the carrier.

FIG. 15 is a fragmentary plan view of a portion of the strap mounting shown in FIG. 14.

FIG. 16 is a fargmentary end elevational view of the carrier shown in FIGS. 8—10.

FIG. 17 is a fragmentary sectional view taken along the line 17—17 in FIG. 16.

FIG. 18 is a fragmentary sectional view taken along the line 18—18 in FIG. 16.

Figure 8:
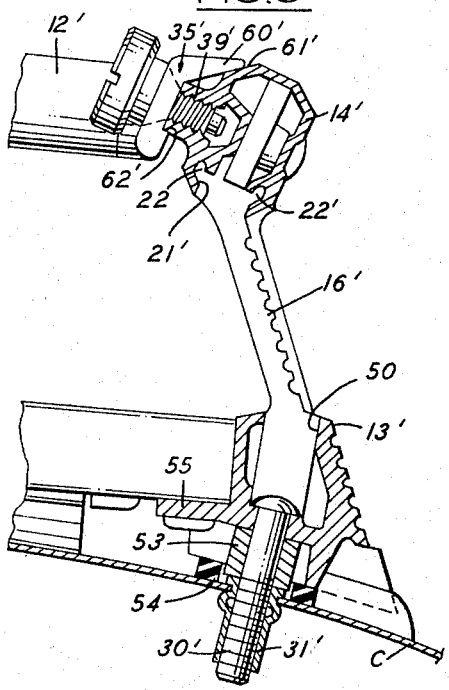
FIG. 8 is a fragmentary sectional view similar to FIG. 3 of a modified form of carrier.

Referring to FIG. 1, the car top luggage carrier embodying the invention comprises a pair of side rail assemblies 10 adapted to be mounted on a car top and extending longitudinally thereof and transversely extending longitudinally spaced cross members 11. The carrier also includes longitudinally adjustable tubular end rails 12.

As shown in FIG. 3, each side rail assembly 10 comprises a lower side rail 13, an upper side rail 14 and stanchions 15 on which the upper and lower side rails are mounted. A plurality of strut members 16 are provided at longitudinally spaced points along the length of the side rails 13, 14 and extend between the side rails 13, 14.

As shown in FIG. 3, each lower side rail 13 is generally T-shaped and is provided with an upwardly extending longitudinal slot 17 in which the lower end of each strut member 16 extends. A screw 18 is threaded through the upper end of the lower side rail 13 to hold the strut member 16 in the slot 17.

As further shown in FIGS. 3 and 4, each upper side rail 14 has a generally inverted U-shaped cross section and has spaced flanges 19, 20 along the lower edges thereof which define grooves 21. The upper end of each strut member 16 is formed with extending ribs 22 which slidably engage the grooves 21 in the upper side rails 14 to lock the upper end of the strut member 16 in position.

Each of the cross members 11 is preferably hollow and held in position by bolts 23 extending upwardly through openings 24 in the lower side rails 13 and threaded into nuts 25 positioned internally of the cross members 11 (FIG. 5). Each of the stanchions 15 is provided with integral projections 26, 27 that extend horizontally into the ends of the side rails 14, 13, respectively. Screws 28, 29 fix the side rails on the stanchions 15.

Where the car top carrier is to be permanently attached to the car top, bolts 30 extend downwardly and are threaded into deformable nuts 31 in the car top C. An appropriate spacer 32 is provided. A resilient rubber pad 32' is provided. A trim strip 33 may be fastened along the lower edge of the lower side rail 13 by screws 34'.

Referring to FIG. 3, each end rail 12 is provided with a bracket 35 in which screws 36 having knobs 37 thereon are journalled. Each upper side rail 14 is formed with an inwardly extending longitudinal slot 38 that has longitudinally extending ribs 39 therein. Screws 36 can be threaded into the ribs 39. The bracket 35 is formed with a surface 40 that is adapted to engage a shoulder 41 on the upper side rail 14. A pair of screws 36 are provided on each bracket 35. The position of the end rails 12 longitudinally of the carrier can be changed by unscrewing the screws 36 from the slot 39, lifting the end rail 12 and moving it to a new longitudinal position where the surface 40 engages shoulder 41. The screws 36 can be threaded into engagement with the ribs 39 by rotating knobs 37 to lock the end rail 12 in a new longitudinal position. Each mounting bracket has a shoulder 35' which engages the lower wall of slot 39 and cooperates with the surface 40 to prevent the walls of the slot from tending to spread apart.

In accordance with the invention, each of the upper rail 14, lower rail 13 and strut members 16 are preferably made of aluminum extrusions thereby reducing the cost of the carrier as contrasted to making the side rail assembly as a single extrusion. The carrier can be readily assembled to the desired length cutting the rails 13, 14 to any desired length, placing an appropriate number of strut members 16 theneon and then adding the end stanchions 15.

Figure 12:
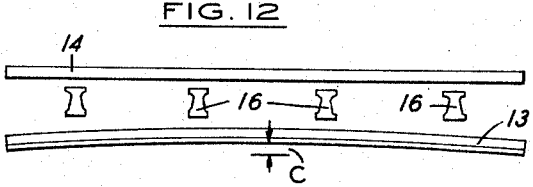
FIGS. 12 and 13 are generally diagrammatic views showing the manner in which parts of the carrier are assembled in tension.
Figure 13:
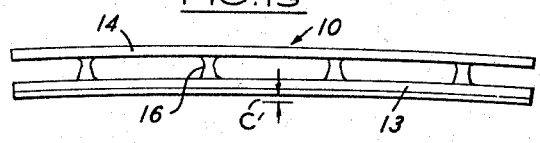

As shown in FIGS. 12 and 13, which are diagrammatic views of the side rail asemblies 10, the lower side rail 13 is preferably curved longitudinally and the upper side rail 14 is preferably straight. As a result, when the side rails 13, 14 are assembled by sliding the strut members 16 into the slots and fixing the strut members therein, the straightened upper side rail 14 tends to straighten the lower side rail 13 and at the same time the curved lower side 13 tends to bend or curve the straight upper side rail 14. The resultant side rail assembly 10 has a general curvature longitudinally which is less than the curvature of the lower side rail 13 before assembly. This general relationship is shown by the distances C, C' in FIGS. 12 and 13, respectively.

The arrangement places the side rails 13, 14 under tension so that there is less tendency for the assembly to loosen and produce noise between the parts.

Figure 9:
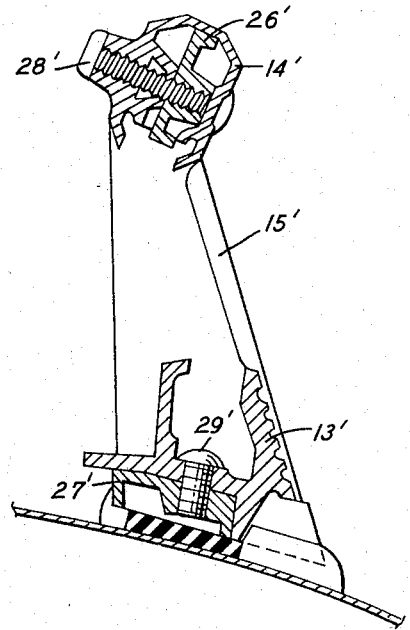
FIG. 9 is a fragmentary sectional view similar to FIG. 5 of the carrier shown in FIG. 8.
Figure 10:
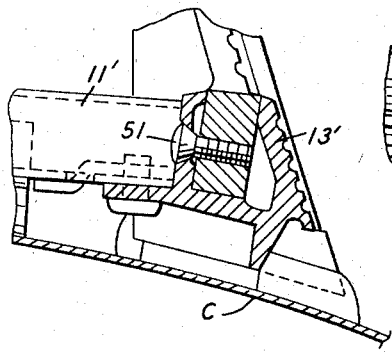
FIG. 10 is a fragmentary sectional view of the carrier shown in FIGS. 8 and 9 taken along the vertical plane spaced longitudinally along the length of the carrier.
Figure 11:
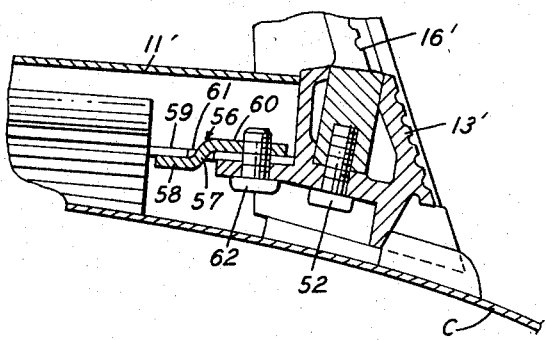
FIG. 11 is a fragmentary sectional view similar to FIG. 10 showing a modified carrier.

The form of the invention shown in FIGS. 8–10 and 16 is similar to the previously described form. In this form, the lower side rail 13' has a lesser vertical height and is formed with a slot 50 into which the lower end of the strut member 16' extends. As shown in FIG. 10, the lower end of the strut member 16' can be held in position by screw 51 threaded generally horizontally into the strut member 16'. Alternatively, as shown in FIG. 11, a screw 52 can be threaded upwardly into the strut member 16'. The upper end of each strut member 16' is formed with extending ribs 22' which slidably engage grooves 21' in the upper side rails 14 as in the previous form of the invention. The arrangement shown in FIG. 10 permits the lower side rail 13' and associated cross members 11' to be assembled on the car top at the factory and the strut member 16' and upper side rails 14' to be added when the car arrives at the dealer. By this arrangement, the vertical height of a car is not increased substantially during transport thereby permitting the car to be transported on vehicles where there is a minimum vertical clearance.

As further shown in FIG. 8, the car top carirer is adapted to be mounted on a car top by bolts 30' which extend downwardly and are threaded into the deformable nuts 31' in the car top C. A spacer 53 and resilient pad 54 are provided as in the previous form of the invention.

As shown in FIG. 9, the end stanchions 15' include projections 26' and 27' that project into the upper and lower side rails 14', 13' and are held in position by screws 28', 29' as in the previous form of the invention.

Referring to FIGS. 10 and 11, in this form of the invention, the cross members 11' are held in position on a projecting shoulder 55 that extends longitudinally of the lower side rail 13' by mounting brackets 56. Each mounting bracket is generally rectangular and made of a material of substantially uniform thickness. Each mounting bracket 56 includes an intermediate bent portion 57 so that one end 58 of the bracket extends below the inwardly extending flanges 59 (FIGS. 17, 18) of cross member 11' and the other end 60 extends above the flanges 59 with the intermediate portion 57 extending through notches 61 in the flanges 59. A screw 62 is threaded upwardly through the shoulder 55 into the end 60. By this arrangement, any tendency of a load to pull the end assembly away from the cross member 11' is firmly opposed.

As shown in FIG. 8, the bracket 35' on the end of the end rail 12' is modified and includes an inclined upper projection which engages the inclined surface 61' on the upper side rails 14'. The bracket includes a shoulder 62' which engages the lower wall of the slot 39' and cooperates with the projection 60 to prevent the walls of the slot from tending to spread apart.

Referring to FIGS. 16–18, a flexible elastic insulator 65 is preferably mounted on the underside of cross members 11' and includes a central longitudinally extending enlarged portion 66 that projects betwen the spaced flanges 59 and generally accordion tubular portions 67 extending laterally from the central projection 66 beneath the flanges 59. Each portion 67 has collapsable folds 68 which accommodate variations in space between the flanges 59 and the car top C. Thus, as shown in FIGS. 16, if the car top has substantial variations in curvature, the insulators 65 accommodate the spacing between cross members 11' and the car top. Where there is a substantial change in curvature as at 70, the lower portions 67 of the insulator are preferably cut in two sections to permit better accommodation to the sudden change of curvature.

Instead of permanently mounting the carrier on the car top, a strap assembly can be used as shown in FIGS. 14 and 15. Each strap assembly includes a bracket 75 having a hook 76 thereon which can be engaged with shoulder 55 of lower rail 13', or the corresponding shoulder of rail 13, at various positions along the length of the carrier. Bracket 75 includes an upstanding flange 77 at the other end thereof into which a screw 78 is threaded. The screw 78 has an enlarged head 79 that abuts the sides of an opening in a bracket 80. The bracket 80 is in turn engaged with one of a plurality of openings 81 in a strap 82. The lower end of the strap has a hook member 83 fastened thereto by a rivet 84 and engaging the trough E of a car top. A locking tab 85 projects downwardly from a plate 86 held in position by a screw 87 into the end of trough E to positively lock the strap. A plastic or rubber sleeve 88 can be provided over the strap to prevent scratching of the car top. By this arrangement, the strap mounting can be engaged with the car top carrier at any point along the length thereof.

It can thus be seen that there has been provided a car top luggage carrier which can be manufactured at low cost with a minimum of labor; which has parts with tension to minimize noise; which utilizes extrusions; which incorporates a movable end rail that can be readily lifted from one position to another to retain any width of luggage or load; and which can be adapted to the permanent or strap mounting.

I claim:
1. In a car top luggage carrier, the combination comprising
    a pair of side rail assemblies,
    each said side rail assembly comprising a lower side rail,
    a separate upper side rail,
    stanchions at the ends of the upper and lower side rails,
    means connecting the ends of said side rails to said stanchions,
    a plurality of separate strut members extending between said upper and lower side rails at longitudinally spaced points therealong,
    means for joining the upper ends of said strut members to said upper rail,
    means for joining the lower end of each said strut member to said lower rail,
    a plurality of longitudinally spaced transversely extending cross members,
    means for joining the ends of said cross members to said lower side rails,
    and at least one end rail extending transversely across opposed upper side rails,
    each said upper side rail having a longitudinally extending generally inwardly facing slot therein,
    the sides of said slot being formed with longitudinally extending ribs defining threads for engagement by screws,
    each said upper side rail having a shoulder thereon,
    said end rail being provided with a complementary longitudinally extending surface at each end thereof for engaging said shoulder,
    screws journalled in the ends of said end rails and adapted to be threaded into said slots in said upper side rails,
    whereby said end rail can be removed by loosening said screws, lifting the end rail and moving it to a longitudinally spaced point on said upper side rails to engage said surface with said shoulder and thereafter threading said screws inwardly into engagement with the ribs of said slot.
2. In a car top luggage carrier the combination comprising
    a pair of side rail assemblies,
    each said side rail assembly comprising an extruded lower side rail,
    an upper extruded side rail,
    stanchions at the ends of the upper and lower side rails,
    means connecting the ends of said side rails to said stanchions,
    a plurality of strut members extending between said upper and lower side rails at longitudinally spaced points therealong, means for joining the upper ends of said strut members to said upper rail, means for joining the lower end of each said strut member to said lower rail, said upper and lower side rails having a different curvature prior to assembly such that when the side rail assemblies are assembled, the side rails are under tension, a plurality of longitudinally spaced transversely extending cross members, means for joining the ends of said cross members to said lower side rails, and at least one end rail extending transversely across opposed upper side rails, each said upper side rail having a longitudinally extending generally inwardly facing slot therein, the sides of said slot formed with longitudinally extending ribs defining threads for engagement by screws, each said upper side rail having a shoulder thereon, said end rail being provided with a complementary longitudinally extending surface at each end thereof for engaging said shoulders, screws journalled in the ends of said end rails and adapted to be threaded into said slots in said upper side rails, whereby said end rails can be removed by loosening said screws, lifting the end rail and moving it to a longitudinally spaced point on said upper side rails to engage said surface with said shoulder and thereafter threading said screws inwardly into engagement with the ribs of said slot.

3. The combination set forth in claim 2 wherein each said upper side rail has an inverted U-shaped cross section.

4. The combination set forth in claim 2 wherein each said lower side rail is generally C-shaped in cross section.

5. The combination set forth in claim 2 wherein said means for joining the upper ends of said strut members to said upper rail comprises a plurality of inwardly spaced downwardly extending longitudinal flanges on each said upper side rail defining slots, each said strut member having ribs in the upper end thereby slidingly engaging said slots.

6. The combination set forth in claim 2 wherein said means joining the lower end of each said strut member to said lower side rail comprises an upwardly facing slot in each said lower side rail, each said strut member extending downwardly into said slots, and means extending laterally through said lower side rail and through said strut member to lock said strut member relative to said lower side rail.

7. In a car top luggage carrier, the combination comprising a pair of side rail assemblies, each said side rail assembly comprising an upper side rail, stanchions at the ends of the upper side rails, means connecting the ends of said side rails to said stanchions, and at least one end rail extending transversely across opposed upper side rails, each said upper side rail having a longitudinally extending generally inwardly facing slot therein, the sides of said slot formed with longitudinally extending ribs defining threads for engagement by screws, each said upper side rail having a shoulder thereon, each said end rail being provided with a complementary longitudinally extending surface at each end thereof for engaging said shoulder, screws journalled in the ends of said end rails and adapted to be threaded into said slots in said upper side rails, whereby said end rails can be removed by loosening said screws, lifting the end rail to engage said surface with said shoulder and moving it to a longitudinally spaced point on said upper side rails and thereafter threading said screws inwardly into engagement with the ribs of said slot.

8. In a car top luggage carrier, the combination comprising a pair of side rail assemblies, each said side rail assembly comprising a lower extruded side rail, a separate upper extruded side rail having an inverted U-shaped cross section, stanchions at the ends of the upper and lower side rails, means connecting the ends of said side rails to said stanchions, a plurality of separate strut members extending between said upper and lower side rails at longitudinally spaced points therealong, each said upper side rail including a plurality of inwardly spaced longitudinally extending flanges, each said strut member having ribs in the upper end thereby slidingly engaging said flanges, means for joining the lower end of each said strut member to said lower rail, a plurality of longitudinally spaced transversely extending cross members, means for joining the ends of said cross members to said lower side rails, and at least one end rail extending transversely across opposed upper side rails, each said upper side rail having a longitudinally extending generally inwardly facing slot therein, the sides of said slot formed with longitudinally extending ribs defining threads for engagement by screws, each said upper side rail having a shoulder thereon, each said end rail being provided with a complementary longitudinally extending surface on each end thereof for engaging said shoulder, screws journalled in the ends of said end rails and adapted to be threaded into said slots in said upper side rails, whereby said end rails can be removed by loosening said screws, lifting the end rail and moving it to a longitudinally spaced point on said upper side rails and thereafter threading said screws inwardly into engagement with the ribs of said slot.

9. The combination set forth in claim 8 wherein said means joining the lower end of each said strut member to said lower side rail includes an upwardly facing slot in each said lower side rail, each said strut member extending downwardly into said slots, and means extending laterally through said lower side rail and through said strut member to lock said strut member longitudinally relative to said lower side rail.

10. In a car top luggage carrier, a side rail assembly comprising an extruded lower side rail, a separately extruded upper side rail, stanchions at the ends of the upper and lower side rails, means connecting the ends of said side rails to said stanchions, a plurality of separate strut members extending between said upper and lower side rails at longitudinally spaced points therealong, each said upper side rail including a plurality of inwardly spaced longitudinally extending flanges, each said strut member having ribs in the upper end thereby slidingly engaging said flanges, means for joining the lower end of each said strut member to said lower rail.

11. The combination set forth in claim 10 wherein said means joining each said strut member to the lower side rail includes
an upwardly facing slot on each said lower side rail,
each said strut member extending downwardly into said slots,
and means extending laterally through said lower side rail and through said strut member to lock said strut member longitudinally relative to said lower side rail.

12. In a car top luggage carrier, the combination comprising
a pair of side rail assemblies,
each said side rail assembly comprising a lower side rail,
an upper side rail,
stanchions at the ends of the upper and lower side rails,
means connecting the ends of said side rails to said stanchions,
a plurality of strut members extending between said upper and lower side rails at longitudinally spaced points therealong,
means for joining the upper ends of said strut members to said upper rail,
means for joining the lower end of each said strut member to said lower rail,
said upper and lower side rails having a different curvature prior to assembly such that when the side rail assemblies are assembled, the side rails are under tension,
a plurality of longitudinally spaced transversely extending cross members,
means for joining the ends of said cross members to said lower side rails,
and at least one end rail extending transversely across opposed upper side rails,
each said upper side rail having a longitudinally extending generally inwardly facing slot therein,
the sides of said slot being formed with longitudinally extending ribs defining threads for engagement by screws,
each said upper side rail having a shoulder thereon,
said end rail being provided with a complementary longitudinally extending surface at each end thereof for engaging said shoulders,
screws journalled in the ends of said end rails and adapted to be threaded into said slots in said upper side rails,
whereby said end rail can be removed by loosening said screws, lifting the end rail and moving it to a longitudinally spaced point on said upper side rails to engage said surface with said shoulder and thereafter threading said screws inwardly into engagement with the ribs of said slot.

13. In a car top luggage carrier, the combination comprising
a pair of side rail assemblies,
each said side rail assembly comprising a lower side rail,
a separate upper side rail,
stanchions at the ends of the upper and lower side rails,
means connecting the ends of said side rails to said stanchions,
a plurality of separate strut members extending between said upper and lower side rails at longitudinally spaced points therealong,
means for joining the upper ends of said strut members to said upper rail,
means for joining the lower end of each said strut member to said lower rail,
a plurality of longitudinally spaced transversely extending cross members,
means for joining the ends of said cross members to said lower side rails,
said means for joining the ends of said cross members comprising a longitudinally extending projection on each said lower side rail,
each said cross member having inwardly extending flanges,
and a mounting bracket having one end thereof engaging said flanges,
said flanges having a notch therein through which said mounting bracket extends,
the other end of said bracket extending adjacent said projection on said lower side rail,
and fastener means extending through said projection into said other end of said bracket.

14. In a car top luggage carrier
including side rails and cross members extending between the side rails,
means for joining the ends of said cross members to said side rails comprising
a longitudinally extending projection on each said side rail,
each said cross member having inwardly extending flanges,
and a mounting bracket having one end thereof engaging said flanges,
said flanges having a notch therein through which said mounting bracket extends,
the other end of said bracket extending adjacent said projection on said side rail,
and fastener means extending through said projection into said other end of said bracket.

15. In a car top luggage carrier, a side rail assembly comprising
an extruded lower side rail,
an extruded upper side rail,
stanchions at the ends of the upper and lower side rails,
means connecting the ends of said side rails to said stanchions,
a plurality of strut members extending between said upper and lower side rails at longitudinally spaced points therealong,
each said upper side rail including a plurality of inwardly spaced longitudinally extending flanges,
each said strut member having ribs in the upper end thereby slidingly engaging said flanges,
said upper and lower side rails having a different curvature prior to assembly such that when the side rail assemblies are assembled, the side rails are under tension.

16. In a car top luggage carrier, the combination comprising
a pair of side rail assemblies,
each said side rail assembly comprising a lower side rail,
an upper side rail,
stanchions at the ends of the upper and lower side rails,
a plurality of strut members extending between said upper and lower side rails at longitudinally spaced points therealong,
and at least one end rail extending transversely across opposed upper side rails,
each said upper side rail having a longitudinally extending generally inwardly facing slot therein,
the sides of said slot formed with longitudinally extending ribs defining threads for engagement by screws,
each said upper side rail having a shoulder thereon,
each said end rail being provided with a complementary longitudinally extending surface at each end thereof for engaging said shoulder,
screws journalled in the ends of said end rails and adapted to be threaded into said slots in said upper side rails,
whereby said end rails can be removed by loosening said screws, lifting the end rail to engage said surface with said shoulder and moving it to a longitudinally spaced point on said upper side rails and thereafter threading said screws inwardly into engagement with the ribs of said slot.

References Cited

UNITED STATES PATENTS

| 2,682,322 | 6/1954 | Bloedow | 189—36 |
| 2,827,958 | 3/1958 | Lee | 105—369 |
| 3,253,755 | 5/1966 | Bott | 224—42.1 |

FOREIGN PATENTS

| 1,010,193 | 3/1952 | France. |
| 1,092,494 | 4/1955 | France. |
| 1,241,253 | 8/1960 | France. |
| 453,688 | 12/1949 | Italy. |

GERALD M. FORLENZA, *Primary Examiner.*

J. E. OLDS, *Assistant Examiner.*